US010350553B2

(12) United States Patent
Kamada et al.

(10) Patent No.: US 10,350,553 B2
(45) Date of Patent: Jul. 16, 2019

(54) COMPOSITE SEPARATION MEMBRANE AND SEPARATION MEMBRANE ELEMENT USING THE SAME

(75) Inventors: Takashi Kamada, Osaka (JP); Takuji Shintani, Osaka (JP); Toshinori Tsuru, Hiroshima (JP); Tomohisa Yoshioka, Hiroshima (JP); Chunlong Kong, Hiroshima (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/578,946

(22) PCT Filed: Feb. 16, 2011

(86) PCT No.: PCT/JP2011/000858
§ 371 (c)(1),
(2), (4) Date: Oct. 30, 2012

(87) PCT Pub. No.: WO2011/102124
PCT Pub. Date: Aug. 25, 2011

(65) Prior Publication Data
US 2013/0037482 A1 Feb. 14, 2013

(30) Foreign Application Priority Data
Feb. 16, 2010 (JP) .................................. 2010-031648

(51) Int. Cl.
*B01D 71/56* (2006.01)
*B01D 69/02* (2006.01)
*B01D 69/12* (2006.01)
*C02F 1/44* (2006.01)
*B01D 61/02* (2006.01)
*C02F 103/04* (2006.01)
*C02F 103/08* (2006.01)

(52) U.S. Cl.
CPC ............. *B01D 71/56* (2013.01); *B01D 69/02* (2013.01); *B01D 69/125* (2013.01); *C02F 1/44* (2013.01); *B01D 61/025* (2013.01); *B01D 61/027* (2013.01); *B01D 2325/06* (2013.01); *C02F 1/441* (2013.01); *C02F 1/442* (2013.01); *C02F 2103/04* (2013.01); *C02F 2103/08* (2013.01)

(58) Field of Classification Search
None
See application file for complete search history.

(56) References Cited

U.S. PATENT DOCUMENTS

| | | | | |
|---|---|---|---|---|
| 4,488,816 A * | 12/1984 | Vota | .................... | B01F 11/0291 366/116 |
| 4,935,141 A * | 6/1990 | Buck et al. | ............... | 210/500.38 |
| 5,258,203 A * | 11/1993 | Arthur | .................. | B01D 69/125 210/500.38 |
| 5,614,099 A * | 3/1997 | Hirose et al. | .................. | 210/653 |
| 5,733,602 A | 3/1998 | Hirose et al. | | |
| 6,413,425 B1 | 7/2002 | Hachisuka et al. | | |
| 6,521,130 B1 * | 2/2003 | Kono et al. | ..................... | 210/652 |
| 2008/0026190 A1 * | 1/2008 | King et al. | .................. | 428/195.1 |
| 2008/0316477 A1 * | 12/2008 | Murakami | .......... | B01F 11/0266 356/244 |

FOREIGN PATENT DOCUMENTS

| | | | |
|---|---|---|---|
| CN | 101462025 A | * | 6/2009 |
| EP | 0 787 525 | | 8/1997 |
| EP | 1 064 986 | | 1/2001 |
| JP | 59-062309 | | 4/1984 |
| JP | 6-047260 | | 2/1994 |
| JP | 07171363 A | * | 7/1995 |
| JP | 8-224452 | | 9/1996 |
| JP | 9-085068 | | 3/1997 |
| JP | 9-141071 | | 6/1997 |
| JP | 10-337454 | | 12/1998 |
| JP | 11-179175 | | 7/1999 |
| JP | 2001-179061 | | 7/2001 |
| JP | 2001179061 A | * | 7/2001 ............. B01D 69/12 |
| JP | 2005-103517 | | 4/2005 |

(Continued)

OTHER PUBLICATIONS

Singh et al "Probing the structural variations of thin film composite RO membranes obtained by coating polyamide over polysulfone membranes of different pore dimensions", Journal of Membrane Science, vol. 278, Issues 1-2, Jul. 5, 2006, pp. 19-25.*
Kwak, Seung-Yeop, and Dae Woo Ihm. "Use of atomic force microscopy and solid-state NMR spectroscopy to characterize structure-property-performance correlation in high-flux reverse osmosis (RO) membranes." Journal of membrane science 158.1 (1999): 143-153.*
Human Translation of JP 2001-179061.*
Masahiko Hirose, Hiroki Ito, Yoshiyasu Kamiyama, Effect of skin layer surface structures on the flux behaviour of RO membranes, Journal of Membrane Science, vol. 121, Issue 2, Dec. 11, 1996, pp. 209-215.*
Machine translation of CN 101462025.*
Kong, et al., "Controlled synthesis of high performance polyamide membrane with thin dense layer for water desalination", Journal of Membrane Science, vol. 362, issues 1-2, Oct. 2010, pp. 76-80.

(Continued)

*Primary Examiner* — Heidi R Kelley
*Assistant Examiner* — Eric J McCullough
(74) *Attorney, Agent, or Firm* — Hamre, Schumann, Mueller & Larson, P.C.

(57) ABSTRACT

The present invention provides a composite separation membrane with improved separation performance, particularly with an increased permeation flux. The composite separation membrane of the present invention includes a porous support (2) and a separation functional layer (1) formed on this support (2). The separation functional layer (1) is a polyamide membrane having a "double-folded structure" including a first layer portion (11) with a plurality of projections (15*a*, (15*b* . . . ) and a second layer portion (12) that covers at least one or some (15*c* and 15*d*) of these projections. Some projections (15*a* and 15*b*) of the first layer portion (11) extend upward and branch to form the second layer portion (12). There is a vacant space (13) between the first layer portion (11) and the second layer portion (12).

10 Claims, 5 Drawing Sheets

(56) References Cited

FOREIGN PATENT DOCUMENTS

JP         2005103517  A   *   4/2005   ............. B01D 69/12
WO        2009/035415        3/2009

OTHER PUBLICATIONS

Extended European Search Report issued in corresponding European Application No. 11744415.8, dated Jun. 8, 2015, 6 pages.

* cited by examiner

COMPOSITE SEPARATION MEMBRANE AND SEPARATION MEMBRANE ELEMENT USING THE SAME

TECHNICAL FIELD

The present invention relates to a composite separation membrane including a porous support and a separation functional layer formed thereon. This composite separation membrane, mainly as a reverse osmosis membrane (RO membrane) or a nanofiltration membrane (NF membrane), is used for the production of ultrapure water, desalination of brackish water or seawater, wastewater treatment, etc. This composite separation membrane can also be used to remove harmful components or extract active components from wastewater such as dye wastewater, electrodeposition coating wastewater and sewage, and further used for advanced treatment typified by concentration of active components for food applications.

BACKGROUND ART

A composite separation membrane is produced by laminating a separation functional layer having desired separation ability on a porous support. As the separation functional layer, a membrane of a material selected from organic compounds such as polyamide, polysulfone and cellulose acetate is used in accordance with its intended purpose. In the field of reverse osmosis membranes, it is known that a polyamide membrane obtained by polymerization of amine and acid halide is suitable as a separation functional layer. This polyamide membrane is typically an aromatic polyamide membrane obtained by interfacial polymerization of a polyfunctional aromatic amine and a polyfunctional aromatic acid halide. As the porous support for supporting the polyamide membrane, a support in which a microporous layer of polysulfone or the like is formed on a porous supporting material such as a nonwoven fabric is commonly used.

It is known that many microscopic projections are formed on the surface of a polyamide membrane obtained by interfacial polymerization on a porous support. There have been attempts to optimize this microstructure of the surface based on the observation with a scanning electron microscope (SEM) or the measurement with an atomic force microscope (AFM) so as to improve the performance of the composite separation membrane.

Patent Literature 1 discloses a polyamide membrane having an average surface roughness Ra of 55 nm or more. According to Patent Literature 1, an increase in the surface roughness of the polyamide membrane results in the desired improved separation performance required for a reverse osmosis membrane.

Patent Literature 2 discloses a polyamide membrane with projections formed on its surface and having an average diameter of 150 nm or less in terms of equivalent circle diameter. An SEM micrograph in Patent Literature 2 shows that many fine projections are formed almost uniformly on the surface of the polyamide membrane. According to Patent Literature 2, finer projections on the surface of the polyamide membrane results in the improved performance of a composite separation membrane used at high pressure.

Patent Literature 3 discloses a polyamide membrane (separation functional layer) having a parameter L/T of 50 or more when the thickness of this layer is T μm and the actual length of this layer per unit length of the surface is L μm. As shown in FIG. 1 of Patent Literature 3, this separation functional layer is deeply corrugated to form projections and extends over the porous support. According to Patent Literature 3, a separation functional layer satisfying the above conditions has an increased surface area relative to its thickness, resulting in the improved separation performance of the membrane.

Conventional polyamide membranes (separation functional layers) as disclosed in Patent Literatures 1 to 3 are each a single layer formed on the surface of a porous support, and this layer has many projections on the entire surface thereof.

As a specific means for improving the separation performance of a membrane, an addition of an organic compound such as an alcohol or an ether to a solution for forming a polyamide membrane is known (Patent Literatures 1 and 3). Patent Literature 4 discloses many examples of membranes obtained by adding various additives to measure their separation performance (Tables 1 to 3). The use of an additive is effective in increasing the permeation flux of a membrane. Patent Literature 4 reports that the highest permeation flux was obtained in the production examples in which isopropanol was added to each of two solutions used to form a polyamide membrane (Table 1 and Examples 3 to 5).

Composite separation membranes are required to have further improved separation performance. Particularly in recent years, they are required to have improved separation performance suitable for applications, such as wastewater treatment and pretreatment for desalination of seawater, which require a high permeation flux more preferentially than a high salt rejection rate. In addition, a growing demand for increasing the permeation flux to reduce the operational energy (that is, for energy saving) has emerged.

CITATION LIST

Patent Literature

Patent Literature 1 JP 09 (1997)-085068 A
Patent Literature 2 JP 09 (1997)-141071 A
Patent Literature 3 JP 2001-179061 A
Patent Literature 4 JP 08 (1996)-224452 A

SUMMARY OF INVENTION

Technical Problem

It is an object of the present invention to provide a composite separation membrane having a structure suitable for improving the separation performance, in particular, for increasing the permeation flux.

Solution to Problem

The present invention provides a composite separation membrane including: a porous support; and a separation functional layer formed on the porous support. The separation functional layer is a polyamide membrane having a first layer portion with a plurality of projections and a second layer portion that covers at least one or some of the projections.

Advantageous Effects of Invention

While a polyamide membrane included in a conventional composite separate membrane is a single layer, the composite separation membrane of the present invention includes a polyamide membrane composed of two layers (layer portions). This characteristic structure is more suitable for improving the separation performance, in particular, for increasing the permeation flux of the composite separation membrane, than a single-layer structure.

DESCRIPTION OF EMBODIMENTS

Figure 1:
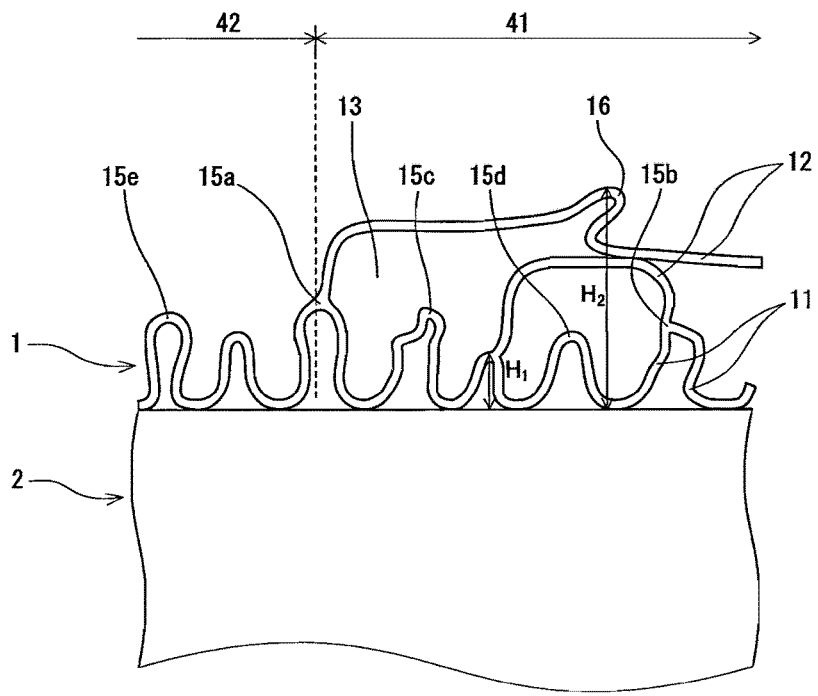
FIG. 1 is a schematic cross-sectional view of an embodiment of the structure of a separation functional layer of the present invention.

FIG. 1 shows an example of the cross-sectional structure of a separation functional layer of the present invention. FIG. 1 shows a typical structure identified by observing the separation functional layer of the present invention using a transmission electron microscope (TEM). FIG. 1 shows, for the convenience of description, an example of the membrane structure that exhibits good separation performance, and the details of the structure of the separation functional layer of the present invention are not intended to be limited to those shown in FIG. 1.

A separation functional layer 1 is formed on a porous support 2, and includes a first layer portion 11 and a second layer portion 12 formed thereabove. The first layer portion 11 is formed to cover the entire surface of the porous support 2 (the entire surface thereof used for the composite separation membrane). Like the first layer portion 11, the second layer portion 12 also may be formed over the entire surface of the porous support 2. However, it is preferable that the second layer portion 12 be formed to cover the first layer portion 11 only in a region 41 of the surface of the porous support 2, as shown in FIG. 1. This is because experiments have proved that a partial coverage is suitable for increasing the permeation flux while suppressing a decrease in the salt rejection rate. Although the exact reason is not known, if the second layer portion grows to cover the entire surface, the density of the membrane decreases, which may cause the membrane to be susceptible to defects. In the embodiment shown in FIG. 1, the first layer portion 11 is exposed without being covered by the second layer portion 12 in a region 42 of the surface of the porous support 2.

In the embodiment shown in this figure, the first layer portion 11 is composed of a single polyamide membrane that is corrugated in the thickness direction of the separation functional layer 1. Many projections (protrusions) 15a, 15b, 15c . . . that project in the opposite direction of the porous support 2 are formed on the surface of the first layer portion 11. The microstructure of the first layer portion 11 is basically the same as the conventionally reported structure of a separation functional layer (for example, FIG. 1 of Patent Literature 3).

The polyamide membrane growing upward from the projections 15a and 15b extends in the membrane surface direction to cover the projections 15c and 15d. As just described, the polyamide membrane extends from one or some (15a and 15b) of the projections of the first layer portion 11. To be more precise, the membrane branches off from near the top of each of these projections to form the second layer portion 12. The second layer portion 12 is formed in such a manner that some of the projections 15a, 15b, 15c . . . of the first layer portion 11 grow abnormally and in some cases they are connected to each other above the first layer portion 11. In the embodiment shown in FIG. 1, there also is a projection 15e that is exposed on the surface of the layer without being covered by the second layer portion 12 in the region 42.

Preferably, the second layer portion 12 is not in contact with the top of the at least one or some of the projections covered by the second layer portion 12 in order to form a vacant space or gap 13 large enough to communicate with the outside of the layer between the first layer portion 11 and the second layer portion 12. In the structure shown in FIG. 1, the polyamide membrane has a much larger surface area than in a structure in which the first layer portion 11 and the second layer portion 12 are filled with a solid material.

The surface of the second layer portion 12 is flatter than that of the first layer portion 11, and this difference in flatness between these surfaces makes it easy to distinguish them by SEM observation. Another feature that distinguishes the surface of the portion 12 from that of the portion 11 is its microscopic morphology. On the surface of the second layer portion 12, a long ridge-like projection 16 extends in the membrane surface direction. When viewed from above, this projection 16 branches and intersects itself like a real mountain ridge. On the other hand, the projections 15a, 15b, 15c . . . of the first layer portion 11 are basically separate peaks, although some of them may be connected in series to form a long line. Typically, the projections each have a substantially spherical top in plan view, at least when they have not yet fully grown. As stated herein, the "ridge-like" projection means, to be precise, a projection having a length longer than 3 times, preferably 5 times, the width thereof, when observed in the direction perpendicular to the membrane surface.

As described above, in the region 41 where the second layer portion 12 is present, the projections 15a, 15b, 15c and 15d of the first layer portion 11 and the projection 16 of the second layer portion 12 are both present in the thickness direction of the layer. This characteristic structure may hereinafter be referred to as a "double-folded structure" because the surface of a layer having many projections is referred to as "folds".

A conventional separation functional layer has no cover corresponding to the second layer portion 12. In the separation functional layer 1, the presence of the second layer portion 12 reduces the apparent surface roughness of the membrane, when observed in the direction perpendicular to its surface. However, the presence of the second layer portion 12 significantly increases the surface area of the separation functional layer 1 per unit area of the surface of the porous support 2.

The thickness of the first layer portion 11 is preferably 0.05 to 3 µm, further preferably 0.05 to 2 µm, and particularly preferably 0.1 to 1 µm. The thickness of the second layer portion 12 is preferably 0.5 to 5 µm, further preferably 0.8 to 3 µm, and particularly preferably 0.8 to 2 µm. The thickness of the first layer portion 11 should be determined from the average height of the projections 15a, 15b, 15c . . . measured from the surface of the porous support 20. The thickness of the second layer portion 12 should be determined from a value obtained by subtracting the thickness of the first layer portion 11 from the height of the highest point (16 in FIG. 1) of the layer measured from the surface of the porous support 20. Preferably, the difference ($H_2-H_1$) between the maximum height $H_2$ of the second layer portion, which is determined at the highest point of the second layer portion 12, and the minimum height $H_1$ of the first layer portion, which is determined at the lowest point of the projections 15a, 15b, 15c . . . of the first layer portion 11, that is, the difference between the maximum height and the minimum height of the "folds" in the "double-folded structure" is 450 nm or more.

The thickness of the polyamide membrane (the thickness of the membrane itself) composed of the first layer portion 11 and the second layer portion 12 is suitably 5 to 50 nm, and particularly suitably 5 to 30 nm. It is preferable that the polyamide membrane be thin and uniform.

Preferably, the second layer portion 12 covers a part of the first layer portion 11, not the whole thereof. In order to increase the permeation flux while suppressing a decrease in the salt rejection rate, the second layer portion 12 preferably covers more than 50%, for example, 50 to 95%, further preferably 50 to 90%, and particularly preferably 50 to 85%, of the region where the first layer portion 11 is formed.

The thickness of each of the layer portions 11 and 12, the thickness of the polyamide membrane, and the proportion of the region 41 where the second layer portion 12 is formed can be determined by observing the surface or the cross section of the membrane with an SEM or a TEM.

As shown in Examples below, the first layer portion 11 and the second layer portion 12 that constitute the separation functional layer 1 can be formed in a single film formation, to be more exact, in a single interfacial polymerization. The fact that there is no need to repeat the film formation to improve the separation performance is very desirable for improving actually mass-produced composite separation membranes.

It is sufficient to use, as the porous support 2, a substrate on which the separation functional layer 1 can be formed. As the porous support 2, an ultrafiltration membrane composed of a nonwoven fabric and a microporous layer formed thereon and having an average pore size of about 1 to 50 nm is preferably used. Examples of the material for forming the microporous layer include polysulfone, polyarylethersulfone such as polyethersulfone, polyimide, and polyvinylidene fluoride. Among these materials, polysulfone and polyarylethersulfone are preferred because of their chemical, mechanical and thermal stabilities. The thickness of the porous support 2 is not particularly limited. For example, it is 25 to 125 µm, and preferably 40 to 75 µm.

The polyamide membrane that constitutes the separation functional layer 1 can be obtained by a film formation method including: a step of forming an aqueous solution coating layer (hereinafter also referred to simply as a "coating layer") on the porous support 2 by using an aqueous solution A (hereinafter also referred to simply as a "solution A") containing a polyfunctional amine; and a step of bringing this coating layer into contact with a solution B containing a polyfunctional acid halide.

In the above film formation method, it is preferable to add an additive to the solution A and/or the solution B in order to obtain the "double-folded structure" that is characteristic of the separation functional layer 1. At least one additive selected from alcohols, ethers, ketones and esters is suitably used, and an organic compound having a solubility parameter of 12 or less, particularly 6 to 12, is preferred.

Preferably, the concentration of the additive in the solution is 0.5 to 5 wt %.

It should be noted, however, that the "double-folded structure" is not always obtained when a solution containing an additive is used.

For example, Patent Literature 3 discloses Examples in which polyamide membranes were formed using solutions B each containing ethyl caprylate, N,N-dibutylformamide, or the like, as an additive. In order to measure the above-mentioned parameter L/T of each of these polyamide membranes, observation with a TEM was performed. However, as described above, the separation functional layers disclosed in Patent Literature 3 are all polyamide membranes consisting of a single layer. The maximum L value (2.95 µm) (L is the actual length of the separation functional layer per micrometer (µm) of the surface length of the porous support) disclosed in Examples of Patent Literature 3 also indicates that all the polyamide membranes disclosed in this literature consist of a single layer. As far as the present inventors have observed the TEM micrographs, the L value of the separation functional layer having the "double-folded structure" exceeds the above value.

There are other reports that disclose the addition of an organic compound as an additive to the solution A and/or the solution B, but they only disclose the formation of a polyamide membrane consisting of a single layer or the data indicating that a polyamide membrane is a single layer, as far as the present inventors know.

For example, in many production examples disclosed in Examples of Patent Literature 4, membranes (Examples 3 to 5 of Patent Literature 4) formed from the solutions A and B each containing an additive exhibited the highest separation performance (the highest permeation flux). However, as described later (in Comparative Example 2), the polyamide membrane produced by this technique is a polyamide membrane having a single-layer structure, even if it has the highest permeation flux and therefore is considered to be most likely to have a double-layer structure.

According to studies by the present inventors, the method of stirring the solution containing an additive influences the structure of a polyamide membrane. It is preferable to subject the additive-containing solution to ultrasonic treatment to obtain the "double-folded structure". Specifically, the solution A should be subjected to ultrasonic treatment before it is brought into contact with the porous support, and the solution B should be subjected to ultrasonic treatment before it is brought into contact with the coating layer. The ultrasonic treatment is considered to accelerate the formation of a mixed phase of film-forming components and additives at the nanometer scale.

In the ultrasonic treatment, a suitable ultrasonic power is 50 to 240 W. When the power is too high, the solutions are heated, which may have an undesirable influence on the solution conditions. When the power is too low, it is difficult to obtain the effect of the ultrasonic treatment. In the ultrasonic treatment, a suitable frequency is 30 Hz to 400 kHz. The treatment time is, for example, 10 to 30 minutes, preferably 15 to 20 minutes. When the treatment time exceeds 30 minutes, overheating is likely to occur. When the treatment time is too short, the mixing in the solution may not proceed sufficiently. In the case where overheating by the ultrasonic treatment causes a problem, a cooling means such as an ice bath may be used.

The time during which the solution B is kept in contact with the coating layer, in other words, the time from when the solution B is brought into contact with the coating layer until when excess solution is removed, also influences the morphology of a polyamide membrane. This contact time is preferably 10 seconds to 10 minutes or 20 seconds to 5 minutes, further preferably 30 seconds to 5 minutes, and particularly preferably 80 seconds to 4 minutes. It is preferable for the formation of the "double-folded structure" to secure sufficient contact time, in other words, to prolong the residence time.

It has been customary to control the progress of the polycondensation reaction between an amine component and an acid halide component by the time from when excess solution is removed from the coating layer in contact with the solution B until when this layer is washed with cleaning fluid (for example, deionized water), specifically the time during which the coating layer is retained in the atmosphere after the excess solution is removed. An appropriate retention time is 1 to 10 minutes in the atmosphere at 20 to 30° C. Preferably, it is 2 to 8 minutes. However, according to studies by the present inventors, the time (the solution residence time) during which the acid halide component and the amine component are in contact with each other in the presence of excess solvent, rather than the retention time in the atmosphere, influences the formation of the "double-folded structure".

As described above, in order to obtain the "double-folded structure", it is preferable to use additives, improve the method of stirring the solutions, and prolong the residence time of the solution B. It is certain that each of these techniques is the step to bring the structure of the membrane closer to the "double-folded structure". However, as shown in Comparable Examples below, the "double-folded structure" is not always obtained when one or two of these are performed. When the concentration of the additive is too low, or the ultrasonic stirring time or the residence time of the solution B is too short, the "double-folded structure" may not be obtained. Therefore, for example, in the case where the "double-folded structure" is not obtained when an additive is added, the conditions required for obtaining the "double-folded structure" may be determined by increasing the concentration of the additive or prolonging the above-mentioned time, with reference to the conditions for Examples below as standard conditions. Even in the case where the resulting membrane has a single-layer structure in spite of the above-mentioned addition of an additive, it is possible to obtain a membrane having the "double-folded structure", if, for example, sufficient ultrasonic stirring is performed.

Examples of the materials, such as amine components, acid halide components and additives, to be added to the solutions to form the polyamide membrane are as follows.

Polyfunctional amine components are suitable as the amine components. More specifically, aromatic, aliphatic, or alicyclic polyfunctional amines are suitable. The amine components may be composed of one compound or of two or more compounds.

Examples of the aromatic polyfunctional amines include m-phenylenediamine, p-phenylenediamine, 1,3,5-triaminobenzene, 1,2,4-triaminobenzene, 3,5-diaminobenzoic acid, 2,4-diaminotoluene, 2,6-diaminotoluene, 2,4-diaminoanisole, amidol, and xylylenediamine.

Examples of the aliphatic polyfunctional amines include ethylenediamine, propylenediamine, and tris(2-aminoethyl) amine.

Examples of the alicyclic polyfunctional amines include 1,3-diaminocyclohexane, 1,2-diaminocyclohexane, 1,4-diaminocyclohexane, piperazine, 2,5-dimethylpiperazine, and 4-aminomethylpiperazine.

In order to facilitate the film formation or improve the performance of the resulting composite separation membrane, a polymer such as polyvinyl alcohol, polyvinylpyrrolidone or polyacrylic acid, or a polyhydric alcohol such as sorbitol or glycerol may be added to the solution A containing a polyfunctional amine component.

A salt of a tetraalkylammonium halide or a trialkylammonium and an organic acid may also be added to the solution A, if necessary, to facilitate the film formation, improve the permeability of the aqueous solution into the porous support, and further accelerate the polycondensation reaction.

Surfactants such as sodium dodecyl benzene sulfonate and sodium dodecyl sulfate (sodium lauryl sulfate) are components to be preferably added to the solution A. These surfactants are effective in improving the wettability of the solution A on the porous support.

In order to accelerate the polycondensation reaction at the interface, an alkaline compound such as sodium hydroxide or trisodium phosphate, which is effective in removing hydrogen halide produced by the interfacial reaction, may be added. It is also beneficial to add a catalyst such as an acylation catalyst to the solution A.

Polyfunctional acid halide components are suitable as the acid halide components. More specifically, aromatic, aliphatic, or alicyclic polyfunctional acid halides are suitable. The acid halide components may be composed of one compound or of two or more compounds.

Examples of the aromatic polyfunctional acid halides include trimesic acid chloride, terephthalic acid chloride, isophthalic acid chloride, biphenyldicarboxylic acid chloride, naphthalenedicarboxylic acid dichloride, benzenetrisulfonic acid chloride, benzenedisulfonic acid chloride, and chlorosulfonylbenzenedicarboxylic acid chloride.

Examples of the aliphatic polyfunctional acid halides include propanetricarboxylic acid chloride, butanetricarboxylic acid chloride, pentanetricarboxylic acid chloride, glutaryl halide, and adipoyl halide.

Examples of the alicyclic polyfunctional acid halides include cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

The concentration of the polyfunctional acid halide component in the solution B is, for example, 0.01 to 5 wt %, preferably 0.05 to 1 wt %, and the concentration of the polyfunctional amine component in the solution A is, for example, 0.1 to 10 wt %, preferably 0.5 to 5 wt %.

Examples of the additives include nitro compounds, alkene halides, aromatic halide compounds, aromatic hydrocarbons, nonaromatic unsaturated hydrocarbons, and heteroaromatic compounds, in addition to the above-mentioned alcohols, ethers, ketones, and esters.

Examples of the alcohols include isopropanol. Examples of the ethers include diethyl ether, t-butyl methyl ether, tetrahydrofuran, and dioxane. Examples of the ketones include acetone, methyl isobutyl ketone, and 2-butanone. Examples of the esters include methyl acetate, ethyl formate, and ethyl acetate. Examples of the nitro compounds include nitroethane and nitromethane. Examples of the alkene halides include trichloroethane, dichloromethane, trichloroethylene, and dichloroethylene. Examples of the aromatic halide compounds include chlorobenzene and fluorobenzene. Examples of the aromatic hydrocarbons include benzene, toluene, fluorobenzene, and chlorobenzene. Examples of the nonaromatic unsaturated hydrocarbons include cyclohexene and heptene. Examples of the heteroaromatic compounds include furan.

Figure 2:
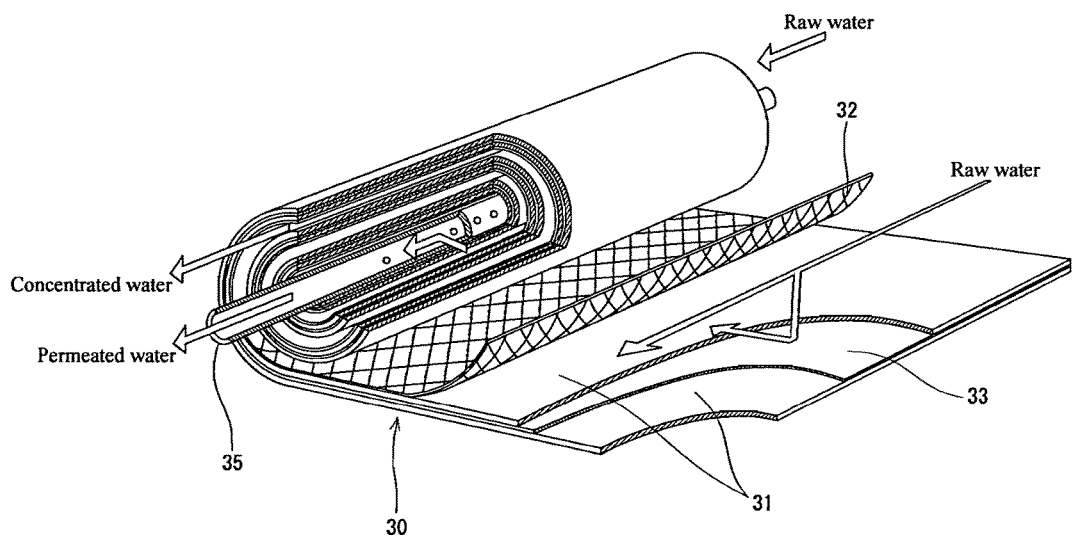
FIG. 2 is a perspective view of an embodiment of a separation membrane element.

The composite separation membrane of the present invention is usually used in the form of a separation membrane element loaded in a pressure vessel. For example, as shown in FIG. 2, a spiral-type membrane element includes a laminated body 30 in which a composite separation membrane 31, a feed-side carrier material 32 and a permeation-side carrier material 33 are in the form of a laminate that is spirally wound around a central tube (water-collecting tube) 35. The membrane element is produced by fixing this laminated body 30 with end members and a sheathing material.

EXAMPLES

Hereinafter, the present invention will be described in more detail by way of Examples and Comparative Examples. The present invention is not limited to the following Examples. First, the method for evaluating composite separation membranes is described.

[Rejection Rate]

The NaCl rejection rate was measured in the following manner. An aqueous NaCl solution with a concentration of 0.20 wt % (at a temperature of 25° C. and pH of 6.5) was allowed to permeate through a composite separation membrane for 30 minutes at an operating pressure of 1.5 MPa. The conductivity of a membrane-permeated solution and that of a feed solution were measured with a conductivity meter ("CM-117" manufactured by Kyoto Electronics). Based on the measurement results, and a calibration curve (concentration–conductivity), the NaCl rejection rate was calculated by the following equation:

Rejection rate (%)=(1−(NaCl concentration in membrane-permeated solution/NaCl concentration in feed solution))×100

In some Examples, the salt rejection rate was measured in the same manner as described above, except that an aqueous $MgSO_4$ solution with a concentration of 0.20 wt % (at a temperature of 25° C. and pH of 6.5) was used instead of the aqueous NaCl solution.

[Permeation Flux]

The permeation flux during the measurement of the rejection rate was calculated by the following equation:

Permeation flux ($m^3/m^2$/day)=(amount of permeated solution/membrane area/sampling time)

[Membrane Structure]

Whether or not the double-folded structure was formed was determined by SEM observation. In addition, the membrane structure was measured in detail by TEM observation.

Example 1

First, a solution (aqueous solution) A and a solution B were prepared. The solution A was prepared by dissolving 2.0 wt % m-phenylenediamine and 0.15 wt % sodium lauryl sulfate in water. The solution B was prepared by dissolving 0.10 wt % trimesic acid chloride and 2 wt % acetone as an additive in hexane and performing 40 kHz ultrasonic irradiation for 15 minutes.

The solution A was applied to a porous polysulfone supporting membrane laminated on a nonwoven fabric so that the supporting membrane and the solution A were in contact for a few seconds. Excess aqueous solution was removed to form a coating layer of the solution A on the supporting membrane. Next, this coating layer was brought into contact with the solution B, and immediately after (a few seconds after) that, the solution B was removed. Then, the supporting membrane was retained in the air for 5 minutes to form a separation functional layer on the supporting membrane. Thus, a composite separation membrane was obtained.

Example 2

A composite separation membrane was obtained in the same manner as in Example 1, except that acetone was replaced by ethyl acetate as an additive to the solution B.

Comparative Example 1

A composite separation membrane was obtained in the same manner as in Example 1, except that no additive (acetone) was added to the solution B.

Comparative Example 2

The conditions were determined with reference to Example 4 of Patent Literature 4, which was reported to exhibit the highest permeation flux. Specifically, a composite separation membrane was obtained in the same manner as in Example 1, except that an additive was added not only to the solution B but also to the solution A and that ultrasonic irradiation was not performed to prepare the solution B. Isopropanol (IPA) was used as an additive, as described in Example 4 of Patent Literature 4. The concentration of IPA in the solution A and that of IPA in the solution B were 20 wt % and 0.2 wt %, respectively.

Example 3

A composite separation membrane was obtained in the same manner as in Comparative Example 1, except that the coating layer and the solution B were in contact for 2 minutes and then excess solution was removed from the coating layer. Further, the concentration of m-phenylenediamine in the solution A was changed to 1.0 wt %.

Figure 3:
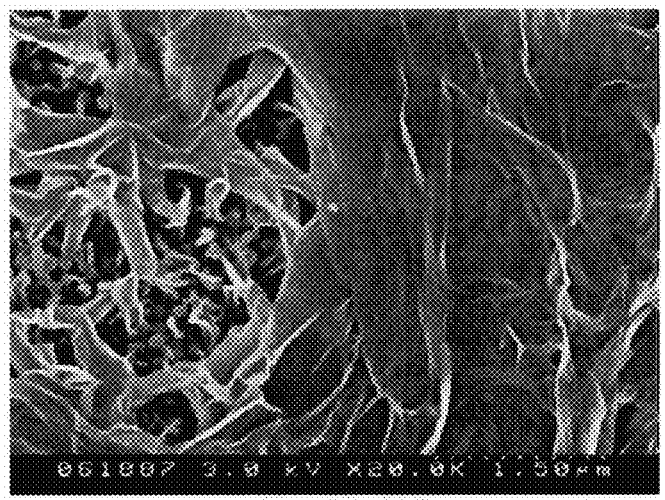
FIG. 3 is a view of the surface of a composite separation membrane fabricated in Example 1, as observed with an SEM in the direction perpendicular to this surface (at a magnification of 20,000).
Figure 4:
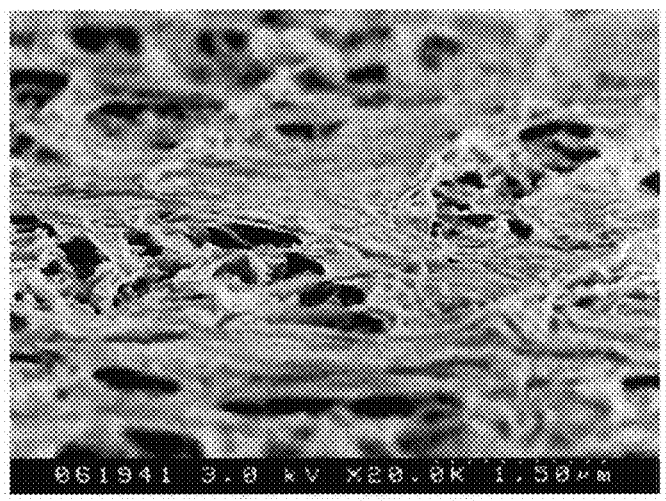
FIG. 4 is a view of the surface of the composite separation membrane fabricated in Example 1, as observed with an SEM in the direction oblique to this surface (at a magnification of 20,000).

Table 1 shows the evaluation results of the composite separation membranes obtained in the above Examples and Comparative Examples. In addition, the SEM observation results are shown in FIGS. 3 and 4 (Example 1), FIG. 5 (Comparative Example 1), and FIG. 6 (Comparative Example 2).

TABLE 1

|  | Additive | Ultrasonic stirring | Prolonged residence | Membrane structure | Salt rejection rate (NaCl: %) | Permeation flux (m³/(m²day)) |
|---|---|---|---|---|---|---|
| Example 1 | acetone | o | x | double | 99.0 | 0.86 |
| Example 2 | ethyl acetate | o | x | double | 99.6 | 1.09 |
| Example 3 | — | o | o | double | 98.8 | 0.89 |
| Comparative Example 1 | — | o | x | single | 99.6 | 0.47 |
| Comparative Example 2 | IPA | x | x | single | 99.2 | 0.67 |

*o: applied x: not applied

As conventionally reported, when an additive is added to a solution, the permeation flux of the resulting separation functional layer increases even if it has a single layer structure (Comparative Example 2). However, it is possible to further significantly increase the permeation flux of the separation functional layer if it has the "double-folded structure" (Examples 1 to 3).

The SEM observation of the composite separation membranes obtained in Examples 2 and 3 also revealed that a separation functional layer, in which the second layer partially covered the first layer, as shown in FIGS. 3 and 4, was formed, although the observation results are not shown herein.

Examples 4 to 7

Figure 7:
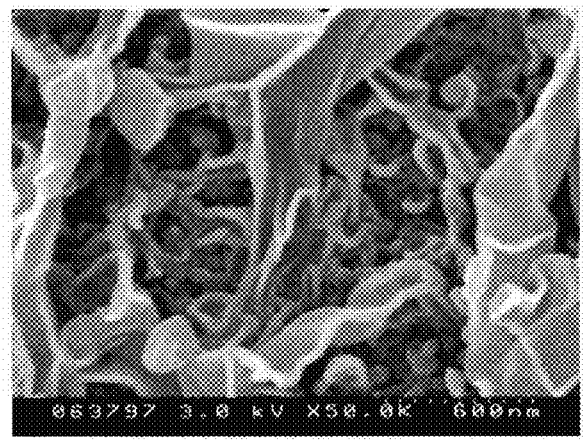
FIG. 7 is a view of the surface of a composite separation membrane fabricated in Example 4, as observed with an SEM in the direction perpendicular to this surface (at a magnification of 50,000).
Figure 9:
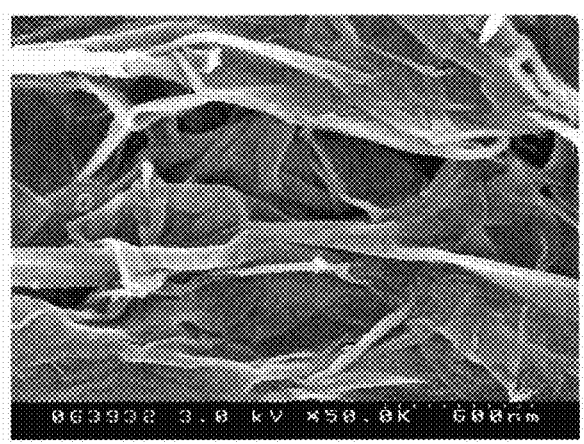
FIG. 9 is a view of the surface of a composite separation membrane fabricated in Example 6, as observed with an SEM in the direction perpendicular to this surface (at a magnification of 50,000).
Figure 10:
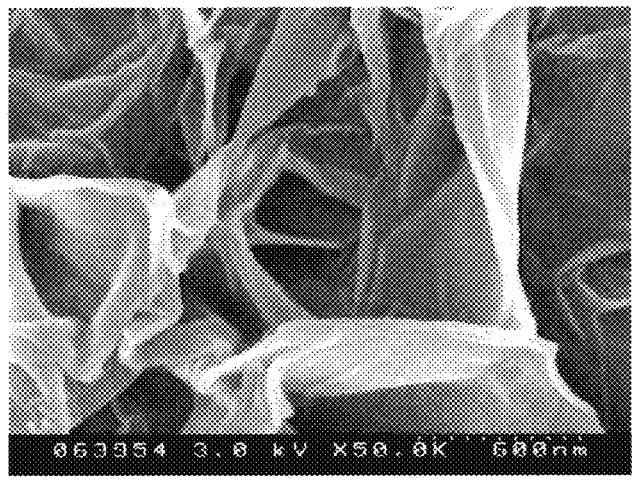
FIG. 10 is a view of the surface of a composite separation membrane fabricated in Example 7, as observed with an SEM in the direction perpendicular to this surface (at a magnification of 50,000).

Composite separation membranes were obtained in the same manner as in Example 1, except that the concentration of acetone in the solution B was varied for each membrane as shown in Table 2. Table 2 shows the evaluation results of these composite separation membranes. In addition, the SEM observation results are shown in FIG. 7 (Example 4), FIG. 8 (Example 5), FIG. 9 (Example 6), and FIG. 10 (Example 7).

TABLE 2

|  | Concentration of acetone (%) | Membrane structure | Coverage (coverage ratio) by 2nd layer portion | Salt rejection rate (NaCl: %) | Permeation flux (m³/(m²day)) |
|---|---|---|---|---|---|
| Comparative Example 1 | 0 | single | — | 99.2 | 0.61 |
| Example 4 | 0.5 | double | partial coverage (<50%) | 99.6 | 0.83 |
| Example 5 | 1.0 | double | partial coverage (≥50%) | 99.6 | 1.06 |
| Example 1 | 2.0 | double | partial coverage (≥50%) | 98.4 | 0.99 |
| Example 6 | 3.0 | double | complete coverage | 88.3 | 0.97 |
| Example 7 | 4.0 | double | complete coverage | 88.0 | 1.02 |

Figure 5:
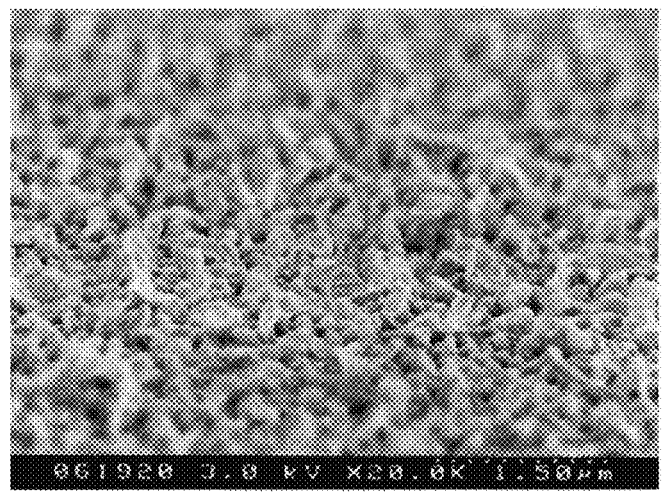
FIG. 5 is a view of the surface of a composite separation membrane fabricated in Comparative Example 1, as observed with an SEM in the direction oblique to this surface (at a magnification of 20,000).
Figure 6:
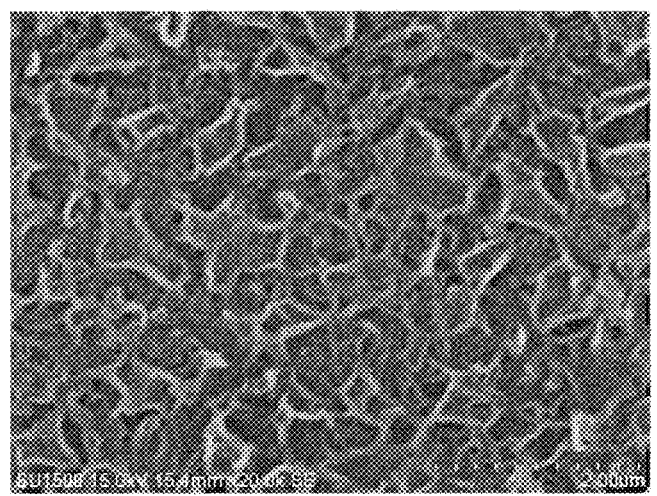
FIG. 6 is a view of the surface of a composite separation membrane fabricated in Comparative Example 2, as observed with an SEM in the direction perpendicular to this surface (at a magnification of 20,000).
Figure 8:
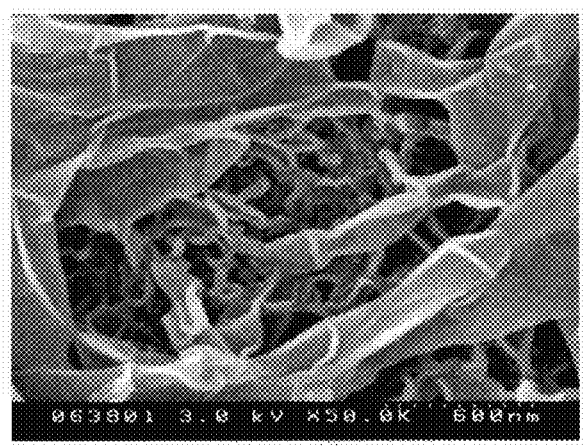
FIG. 8 is a view of the surface of a composite separation membrane fabricated in Example 5, as observed with an SEM in the direction perpendicular to this surface (at a magnification of 50,000).

The degree of coverage of the first layer portion by the second layer portion increased as the concentration of acetone increased. Particularly, in the case where the second layer portion of the separation functional layer partially covers the first layer portion (FIGS. 3, 4, 7 and 8), the permeation flux significantly increases without a significant decrease in the salt rejection rate (Examples 4, 5 and 1), compared to the case where the separation functional layer has a single layer structure (FIGS. 5 and 6). On the other hand, in the case where the second layer portion completely covers the first layer portion (FIGS. 9 and 10), the permeation flux increases but a decrease in the salt rejection rate increases (Examples 6 and 7). Focusing on the increase in the permeation flux, the suitable coverage by the second layer portion is 50% or more and less than 100%, for example, about 50 to 90% (FIGS. 3, 4, and 8).

The invention claimed is:

1. A composite separation membrane comprising:
   a porous support; and
   a separation functional layer formed on a surface of the porous support,
   wherein the separation functional layer is a single polyamide membrane comprising a first layer portion with a plurality of projections and a single second layer portion that visually obstructs at least one or some of the projections, the second layer portion being connected to and branching off from the first layer portion,
   wherein the second layer portion visually obstructs 50 to 90% of an entire region where the first layer portion is formed, when observed in a direction perpendicular to the surface of the porous support,
   wherein a surface of the second layer portion is flatter than that of the first layer portion.

2. The composite separation membrane according to claim 1, wherein the second layer portion does not visually obstruct some of the projections.

3. The composite separation membrane according to claim 1, wherein the first layer portion and the second layer portion are formed in a single film formation.

4. The composite separation membrane according to claim 1, wherein the surface of the second layer portion has a ridge-like projection.

5. The composite separation membrane according to claim 1, wherein the polyamide membrane extends from one or some of the projections to form the second layer portion.

6. The composite separation membrane according to claim 1, wherein the second layer portion is not in contact with the top of the at least one or some of the projections visually obstructed by the second layer portion.

7. A separation membrane element comprising the composite separation membrane according to claim 1.

8. The composite separation membrane according to claim 1, wherein the second layer portion is configured to branch off from a top portion of any one of the projections of the first layer portion.

9. The composite separation membrane according to claim 1, wherein the flatter surface of the second layer portion visually obstructs two or more projections of the first layer portion.

10. A composite separation membrane according to claim 1, wherein the composite separation membrane is a reverse osmosis membrane or a nanofiltration membrane.

* * * * *